United States Patent
Kinoshita et al.

(10) Patent No.: US 6,948,228 B2
(45) Date of Patent: Sep. 27, 2005

(54) RATCHET TYPE ONE-WAY CLUTCH AND METHOD OF MANUFACTURING THE SAME

(75) Inventors: Yoshio Kinoshita, Shizuoka-ken (JP); Hirobumi Shirataki, Fukuroi (JP); Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/389,749

(22) Filed: Mar. 18, 2003

(65) Prior Publication Data

US 2003/0168301 A1 Sep. 11, 2003

Related U.S. Application Data

(62) Division of application No. 09/768,248, filed on Jan. 25, 2001, now Pat. No. 6,557,681.

(30) Foreign Application Priority Data

| Jan. 26, 2000 | (JP) | 2000-017656 |
| Jan. 26, 2000 | (JP) | 2000-017657 |
| Jan. 26, 2000 | (JP) | 2000-017659 |

(51) Int. Cl.$^7$ ............................................. F16D 41/069
(52) U.S. Cl. ................... 29/527.5; 29/90.7; 29/DIG. 49
(58) Field of Search ............................. 29/527.5, 90.7, 29/DIG. 49; 192/43.1, 43.2, 46, 3.28, 3.29, 3.3

(56) References Cited

U.S. PATENT DOCUMENTS

| 4,754,859 | A | | 7/1988 | Ouchi et al. ............... 192/45 |
| 5,308,409 | A | * | 5/1994 | Kamimura et al. ......... 148/512 |
| 5,947,245 | A | | 9/1999 | Costin et al. ................ 192/46 |
| 6,095,693 | A | | 8/2000 | Fujiwara .................... 384/625 |
| 6,125,979 | A | | 10/2000 | Costin et al. ................ 192/46 |
| 6,338,403 | B1 | * | 1/2002 | Costin et al. ................ 192/46 |
| 6,372,063 | B1 | * | 4/2002 | Grillon ....................... 148/552 |
| 6,373,157 | B1 | | 4/2002 | Sekine ........................ 310/78 |
| 6,394,249 | B1 | | 5/2002 | Tazumi et al. ............... 192/45 |
| 6,428,909 | B2 | * | 8/2002 | Oketani et al. ............. 428/650 |

FOREIGN PATENT DOCUMENTS

JP     53-115549     2/1952

* cited by examiner

Primary Examiner—Saul Rodriguez
(74) Attorney, Agent, or Firm—Miles & Stockbridge P.C.

(57) ABSTRACT

A ratchet type one-way clutch in which an outer ring is made of aluminum is improved in durability. In order to solve such problems as an increase in the number of parts, complication, bulkiness, an increase in weight and an increase in cost, there is provided a one-way clutch with the lock-up function also having the function of idly rotating only in one direction and the function of blocking the rotation in both directions. In a ratchet type one-way clutch having an outer ring having a pocket in the inner periphery thereof, an inner ring disposed coaxially with the outer ring and having a notch in the outer periphery thereof, a pawl contained in the pocket and fitted in the notch of the inner ring for transmitting torque between the inner ring and the outer ring, and a resilient member for biasing the pawl toward the inner ring, the outer ring is made of aluminum, and the inner peripheral side surface of the outer ring is subjected to a hardening process.

5 Claims, 8 Drawing Sheets

RATCHET TYPE ONE-WAY CLUTCH AND METHOD OF MANUFACTURING THE SAME

CROSS-REFERENCE TO RELATED APPLICATION

This application is a divisional of application Ser. No. 09/768,248 filed Jan. 25, 2001 now U.S. Pat. No. 6,557,681.

BACKGROUND OF THE INVENTION

1. Field of the Invention

This invention relates to improvements in a one-way clutch used in the transmission of an automobile, an agricultural machine, a construction machine, an industrial machine or the like, and particularly the automatic transmission of a vehicle or the like, and performing the function of a backstop. More particularly, it relates to a ratchet type one-way clutch using a ratchet (pawl) in a lock mechanism and a method of manufacturing the same.

2. Related Background Art

Generally, a one-way clutch used in an automatic transmission has an outer ring and an inner ring rotated relative to each other, and a sprag or a roller for transmitting torque between the outer ring and the inner ring meshes with a cam surface provided on the raceway surface of the outer ring or the inner ring to thereby transmit rotational torque only in one direction. Also, design is made such that the outer ring and the inner ring are idly rotated in the opposite direction.

Such one-way clutches include a ratchet type one-way clutch using a ratchet as a torque transmitting member for transmitting torque between the outer ring and the inner ring. Generally, the ratchet type one-way clutch is comprised of an outer ring having a pocket in the inner periphery thereof, an inner ring disposed coaxially with the outer ring and having a notch in the outer periphery thereof, a pawl contained in the aforementioned pocket, fitted in the notch of the inner ring and bringing the one-way clutch into its locked state to thereby transmit torque between the inner ring and the outer ring, and a resilient member for biasing the pawl toward the inner ring.

FIG. 14 of the accompanying drawings is an axial fragmentary cross-sectional view of the side plate 190 and outer ring 130 of a ratchet type one-way clutch according to the prior art. A pocket 131 for containing a pawl therein is formed in the inner periphery of the outer ring 130. Also, in a state wherein an inner ring and the outer ring are combined together, the side plate 190 abuts against an axial side of the outer ring 130 to thereby regulate the axial movement of the pawl.

Further, it is conceivable to provide, as means for preventing the circumferential relative movement of the outer ring 130 and the side plate 190, a mountain portion 195 on the outer peripheral portion of the side plate 190 and a valley portion 138 in the outer peripheral surface of the outer ring 130, and fit the mountain portion 195 into the valley portion 138.

According to the above-described construction, it is necessary to provide the mountain portion 195 and valley portion 138 only for fitting the side plate 190 to the outer ring 130 in the side plate 190 and outer ring 130 constituting the ratchet type one-way clutch, and this leads to the problem that such clutch is of a shape difficult to work and the cost for the working becomes high.

In the ratchet type one-way clutch of the above-described construction, when the one-way clutch rotates in one direction, the pawl slides freely relative to the outer periphery of the inner ring and therefore, the outer ring and the inner ring idly rotate relative to each other. Next, when the one-way clutch is about to rotate in the other direction, the pawl fits in the notch and the one-way clutch assumes a locked-up state.

Usually, the outer ring of the ratchet type one-way clutch is made of aluminum, but it was not always satisfactory in respect of durability due to, for example, pivotal movement or the like repeated by the pawl in the pocket provided in the outer ring.

Also, the pawl of the ratchet type one-way clutch has a recess having a shape substantially complementary thereto, and fits in a notch formed in the outer periphery of the inner ring. However, satisfaction was not always obtained in respect to durability due to the meshing performance of the ratchet and for example, pivotal movement repeated by the pawl in the pocket provided in the outer ring.

SUMMARY OF THE INVENTION

So, it is an object of the present invention to improve durability in a ratchet type one-way clutch of which the outer ring is made of aluminum.

It is another object of the present invention to improve the meshing performance of a ratchet type one-way clutch to thereby improve the durability of the ratchet type one-way clutch.

It is still another object of the present invention to provide a ratchet type one-way clutch of which the construction of the side plate and outer ring can be simplified and in which the working step therefor can be simplified.

In order to achieve the above objects, the ratchet type one-way clutch of the present invention is a ratchet type one-way clutch comprised of an outer ring having a pocket in the inner periphery thereof, an inner ring disposed coaxially with the outer ring and having a notch in the outer periphery thereof, a pawl contained in the pocket and fitted in the notch of the inner ring and transmitting torque between the inner ring and the outer ring, and a resilient member for biasing the pawl toward the inner ring, characterized in that the outer ring is made of aluminum and the inner peripheral surface of the outer ring is subjected to a hardening process.

Also, in order to achieve the above objects, the ratchet type one-way clutch of the present invention is a ratchet type one-way clutch comprised of an outer ring having a pocket in the inner periphery thereof, an inner ring disposed coaxially with the outer ring and having a notch in the outer periphery thereof, a pawl contained in the pocket and fitted in the notch of the inner ring and transmitting torque between the inner ring and the outer ring, and a resilient member (50) for biasing the pawl toward the inner ring, characterized in that the pressure receiving surface of the notch has a predetermined angle of inclination with respect to a line linking the point of intersection between surfaces constituting the notch and the center of the inner ring together.

In order to achieve the above objects, the ratchet type one-way clutch of the present invention comprises an outer ring having a pocket in the inner periphery thereof, an inner ring disposed substantially concentrically with the outer ring and having a notch in the outer periphery thereof, a pawl contained in the pocket for transmitting torque between the inner ring and the outer ring, a resilient member for biasing the pawl toward the inner ring, and a side plate for limiting the axial movement of the pawl, and is characterized in that the side plate is provided with a convex portion fitted into the pocket.

Also, in order to achieve the above objects, the method of manufacturing a ratchet type one-way clutch of the present invention is a method of manufacturing a ratchet type one-way clutch having an outer ring having a pocket in the inner periphery thereof, an inner ring disposed coaxially with the outer ring and having a notch in the outer periphery thereof, a pawl contained in the pocket and fitted in the notch of the inner ring for transmitting torque between the inner ring and the outer ring, and a resilient member for biasing the pawl toward the inner ring, characterized by the steps of:

molding the outer ring from aluminum by diecasting; and subjecting the surface of the inner peripheral side of the outer ring to a hardening process.

Also, the method of manufacturing a ratchet type one-way clutch of the present invention is a method of manufacturing a ratchet type one-way clutch having an outer ring having a pocket in the inner periphery thereof, an inner ring disposed coaxially with the outer ring and having a notch in the outer periphery thereof, a pawl contained in the pocket and fitted in the notch of the inner ring for transmitting torque between the inner ring and the outer ring, and a resilient member for biasing the pawl toward the inner ring, characterized in that the arcuate portion of the pocket is molded by plastic working.

According to the ratchet type one-way clutch of the present invention, the surface of the inner peripheral side of the outer ring molded of aluminum is subjected to the hardening process and therefore the clutch is improved in durability.

Also, the method of manufacturing a ratchet type one-way clutch of the present invention has the steps of molding the outer ring from aluminum, and subjecting the surface of the inner peripheral side of the outer ring to the hardening process and can therefore manufacture a ratchet type one-way clutch improved in durability.

Also, the pressure receiving surface of the notch is designed to have a predetermined angle of inclination with respect to a line linking the point of intersection between surfaces constituting the notch and the center of the inner ring together and therefore, the pawl falls reliably during meshing engagement.

Also, by the construction as described above, there are obtained the action of restraining wear, and the action that it becomes difficult for fracture to occur because the pressure receiving surface does not become adjacent to a corner portion.

Further, by the construction as described above, the number of notches can be increased and there is obtained the action of decreasing backlash.

Also, by the construction as described above, as in the present invention, the pawl can be reliably dropped into the notch.

Herein, the "pressure receiving surface" refers to a surface having a torque load under its charge when the ratchet type one-way clutch meshes.

The present invention is a ratchet type one-way clutch comprising an outer ring having a pocket in the inner periphery thereof, an inner ring disposed substantially concentrically with the outer ring and having a notch in the outer periphery thereof, a pawl contained in the pocket for transmitting torque between the inner ring and the outer ring, a resilient member for biasing the pawl toward the inner ring, and a side plate for limiting the axial movement of the pawl, the side plate being provided with a convex portion fitted in the pocket.

As the resilient member, utilization can be made of a coil spring, a garter spring, a wave spring or the like. Further, the side plate has a bearing function to the outer ring and the inner ring. Also, the convex portion may preferably be provided with a projection for supporting the axial side of the pawl. It is most desirable that this projection support the center of movement of the pawl.

DESCRIPTION OF THE PREFERRED EMBODIMENTS

Figure 2:
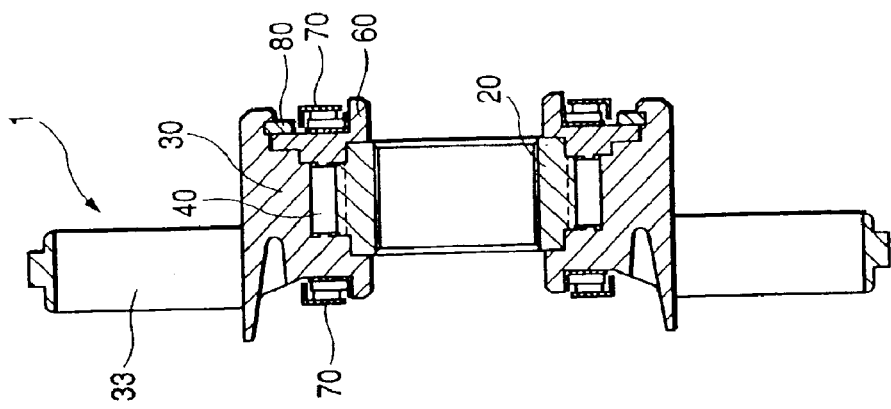
FIG. 2 is a cross-sectional view taken along the line 2—2 of FIG. 1.

Some embodiments of the present invention will hereinafter be described in detail with reference to the accompanying drawings. In the drawings, like portions are designated by like reference numerals.

Figure 1:
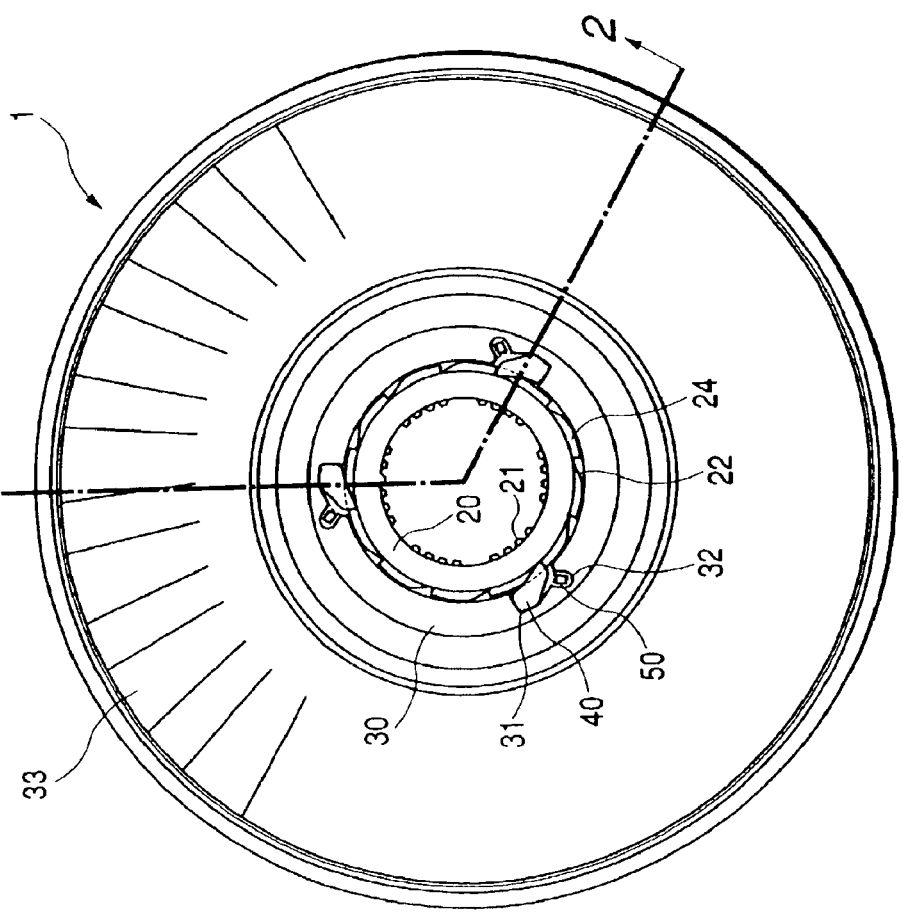
FIG. 1 is a front view of a ratchet type one-way clutch to which each embodiment of the present invention is applied.

FIG. 1 is a front view of a ratchet type one-way clutch to which each embodiment of the present invention is applicable, and FIG. 2 is a cross-sectional view taken along the line 2—2 of FIG. 1.

It is proposed, for example, in U.S. Pat. No. 5,947,245 to use a ratchet type one-way clutch 1 in the stator of a torque converter for an automatic transmission used in an automobile or the like. As shown in FIG. 1 an annular outer ring 30 is molded from a aluminum by diecasting, and is formed integrally with the vanes 33 of a stator. The inner peripheral side of the outer ring 30 has a pocket 31 opening to an inner ring 20 side for containing a pawl 40 therein, and a spring pocket 32 formed in the inner portion of the pocket 31 and opening to the pocket 31 and containing therein a resilient member, i.e., a spring 50, for pressing the tip end portion of the pawl 40 and biasing the pawl 40 to the inner diameter side.

While in FIG. 1, three such pawls 40, pockets 31 and spring pockets 32 are provided circumferentially equidistantly, the number of these may be arbitrary and can be increased or decreased in the relation with torque or the like as required. However, it is preferable that they be provided at an equal pitch in the circumferential direction. Also, FIG. 1 shows that the ratchet type one-way clutch is in a locked state wherein the pawls 40 are fitted in the notches 22 (which will be described later) of the inner ring 20. Also, the springs 50 may preferably be coil springs, but of course, springs in other forms such as wave springs are also usable.

On the other hand, the inner ring 20 has in the outer peripheral side thereof notches 22 fitted to the pawls 40, and has in the inner peripheral side thereof a spline 21 spline-fitted to a shaft, not shown. The notches 22 extends axially, and the axial length thereof corresponds to the axial width of the pawls 40. As shown in FIG. 1, the notches 22 are formed by grinding the outer peripheral portion of a cylindrical member. Thus, the notches 22 and stepped portions 24 are circumferentially equidistantly disposed on the outer periphery of the inner race 20. Of course, the number of the notches 22 and the number of the stepped portions 24 can be arbitrarily set in conformity with the number of the pawls 40.

Also, as shown in FIG. 2, a bearing member 60 intervenes between the outer ring 30 and the inner ring 20 and at one axial end, and the bearing member 60 is prevented from axially slipping off by a snap ring 80. Also, the axial opposite end portions of the ratchet type one-way clutch 1 are rotatably supported by needle bearings 70.

In the ratchet type one-way clutch 1 constructed as described above, the outer ring 30 and each member disposed on the outer ring 30 perform the function that they can rotate rightwardly relative to the inner ring as viewed in FIG. 1, but cannot rotate leftwardly as viewed in FIG. 1 due to the fitting between the pawls 40 and the notches 22. That is, they can idly rotate in the rightward direction, but in the leftward direction, the one-way clutch becomes locked.

Figure 5:
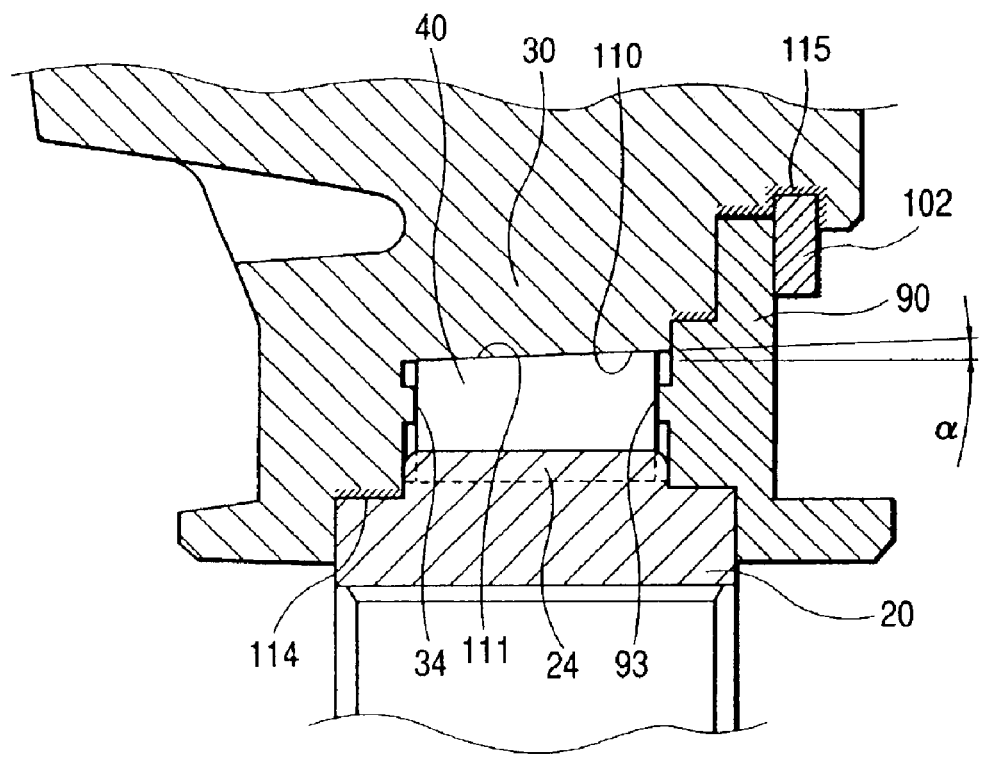
FIG. 5 is a cross-sectional view of the essential portions of a ratchet type one-way clutch according to a second embodiment of the present invention.

Each pawl 40 of the ratchet type one-way clutch 1 performing such an operation, as shown in FIG. 5, is supported from the axially opposite ends thereof by a projection 34 protruding axially inwardly of the pocket 31 from the wall of the axially inner portion of the pocket 31 of the outer ring 30 and a projection 93 protruding axially inwardly of the pocket 31 from the axial end surface of a bearing member 90. Therefore, the pawl 40 pivotally moves about an axis linking the projection 34 and the projection 93 together, and is displaceable between a position in which it is fitted in the notch 22 and a position in which it slides relative to the outer peripheral surface of the inner ring 20.

First to eighth embodiments of the present invention will hereinafter be described on the basis of the above-described ratchet type one-way clutch.

[First Embodiment]

Figure 3:
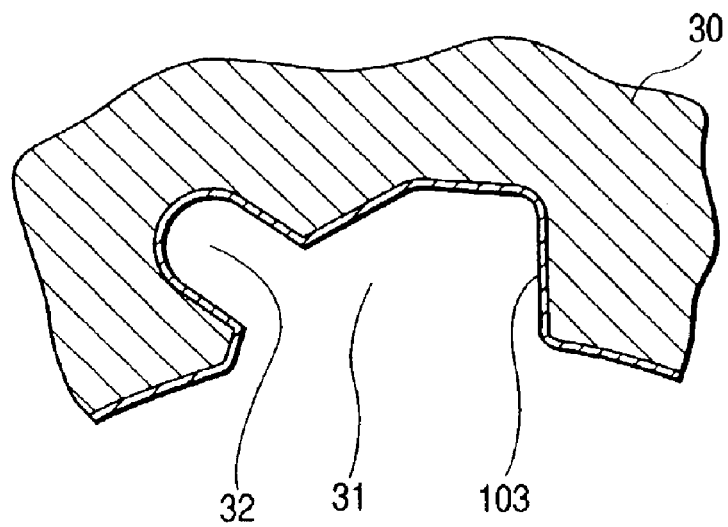
FIG. 3 is a fragmentary cross-sectional view showing the details of an outer ring in a first embodiment of the present invention.
Figure 4:
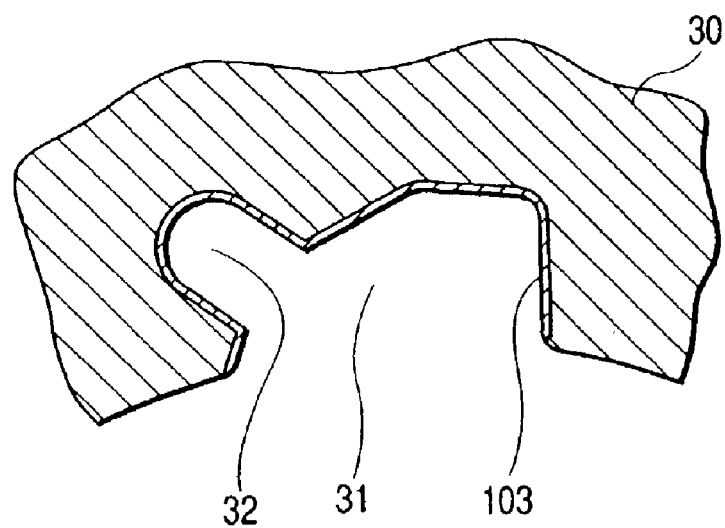
FIG. 4 is a fragmentary cross-sectional view showing the details of the outer ring in the first embodiment of the present invention.

FIGS. 3 and 4 are fragmentary cross-sectional views showing the details of the outer ring 30 in the first embodiment. The inner peripheral surface of the outer ring 30 was subjected to a hardening process to thereby form a hardened layer 103. In FIG. 3, the entire inner peripheral surface of the outer ring 30 was subjected to the hardening process, but as shown, for example, in FIG. 4, only the surface thereof in the pocket 31 can also be subjected to the hardening process. By being subjected to the hardening process, the inner peripheral surface of the outer ring can be restrained from being indented or worn away by the pressure received from the pawl 40 during meshing and during repeated pivotal movement. Also, even if the pawl 40 vibrates or pivotally moves in the pocket 31, the wear of the inner wall of the pocket 31 can be minimized. Thereby, the durability of the ratchet type one-way clutch is improved and the life thereof is extended.

[Second Embodiment]

FIG. 5 is a cross-sectional view of the essential portions of a ratchet type one-way clutch 1 according to the second embodiment of the present invention. As already described, the outer ring 30 is molded from aluminum by diecasting. At this time, from the relation of dies cutting, it is necessary to provide an inclined surface 110 having an angle of inclination (draft angle) $\alpha$ with the joint of the mold as the reference. This inclined surface 110 can be removed by planing work or the like at a later step, but this work requires labor and cost because the shape of the pocket 31 is somewhat complicated. Therefore, the joined surface 111 of the pawl 40 is given an angle of inclination $\alpha$ in advance in accordance with the draft angle $\alpha$ of the outer ring 30. Thus, according to the present embodiment, the labor of working can be saved and the effect of reducing cost can be expected. Regarding the joined surfaces 114 and 115 to the bearing member 90 held by the inner ring 20 and the snap ring 102, planing work becomes necessary in connection with dimensional accuracy and therefore, the inclination can be removed at this time. The joined surfaces to the inner ring 20 and the bearing member 90 are simple in shape and therefore do not require so much labor.

[Third Embodiment]

Figure 6:
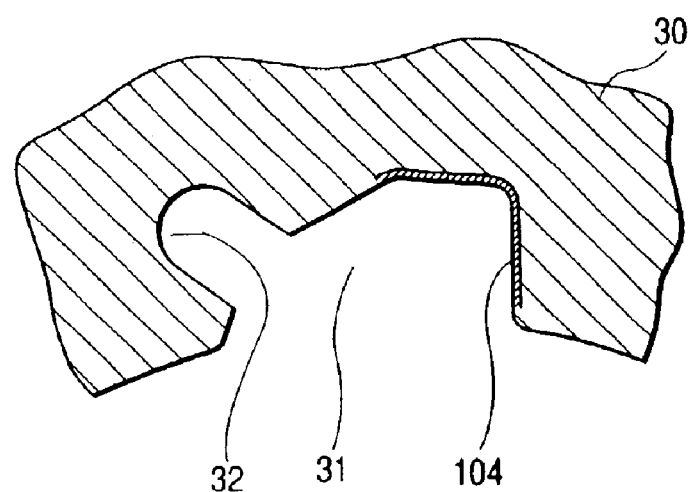
FIG. 6 is a fragmentary cross-sectional view showing the details of an outer ring in a third embodiment of the present invention.

FIG. 6 is a fragmentary cross-sectional view showing the details of the outer ring in the third embodiment. In addition to the above-described diecasting step, the inner peripheral surface of the pocket 31 is subjected to coining or sizing to thereby improve dimensional accuracy and cause work hardening (strain hardening). For example, in the present embodiment, if the pressure receiving surface 104 of the pocket 31 against which the rear portion of the pawl 40 strikes under pressure is worked thus, the disposition accuracy of the pawl 40 is improved and the pressure receiving surface becomes capable of uniformly receiving a load. The "work hardening" used herein refers to the fact that the yield point by plastic deformation (stress which causes plastic deformation clearly to a certain degree) increases.

[Fourth Embodiment]

Figure 7:
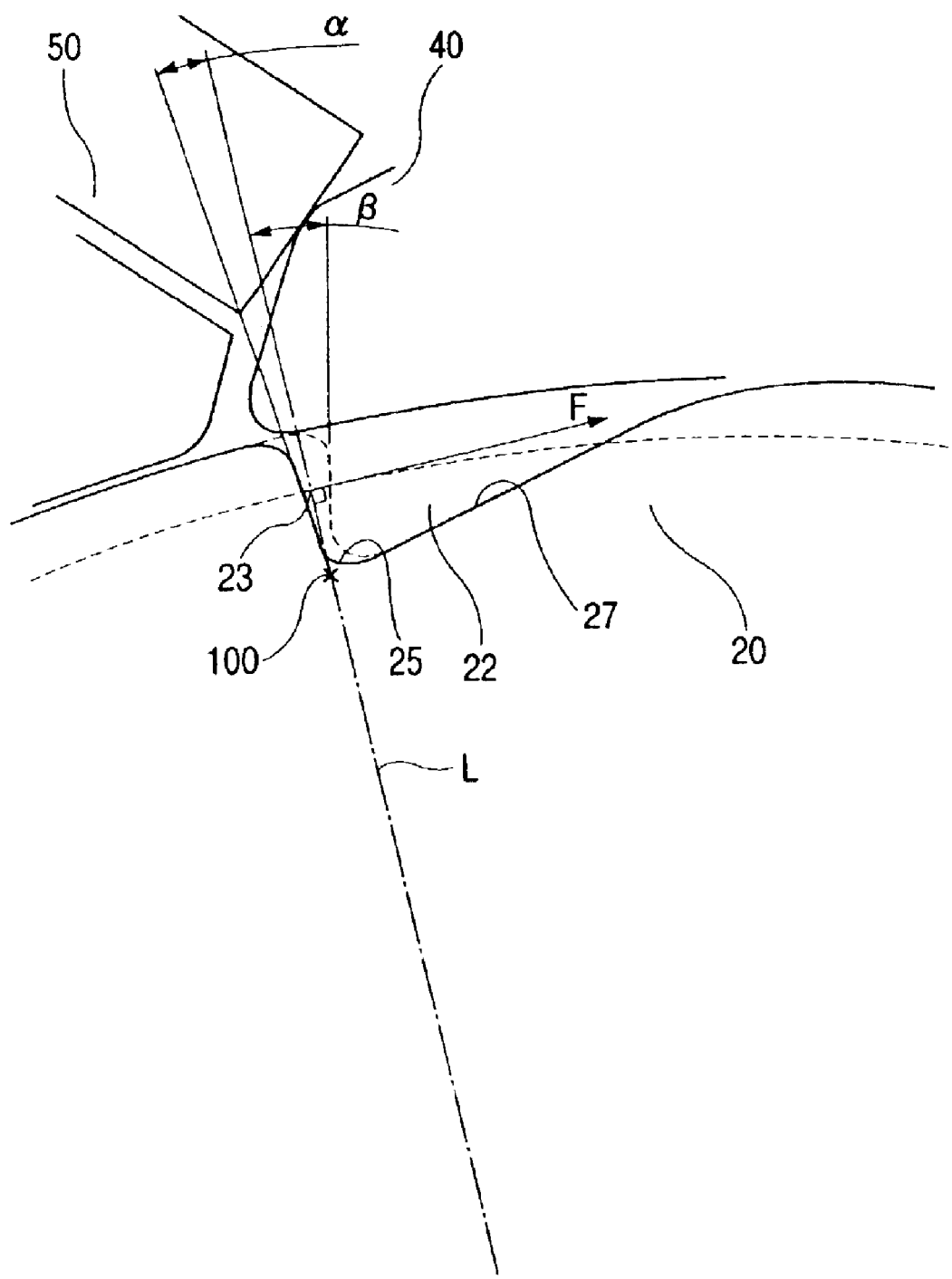
FIG. 7 is a typical view showing the relation between a pawl and a notch in a fourth embodiment on an enlarged scale.

FIG. 7 is a typical view showing the fourth embodiment of the present invention, and showing the relation between the pawl 40 and the notch 22 on an enlarged scale. There is a case where during the reverse rotation of the outer ring 30 and the inner ring 20, due to the pitch errors of the notches 22, the pocket 31, etc. some of the plurality of pawls 40 fall into the notches 22 and some of the pawls 40 do not fall into the notches 22. At this time, a borne torque load comes to be applied to some notches 22 and pawls 40 and this hastens the wear or damage of the portions concerned.

In the fourth embodiment, the notch 22 is given an angle of inclination $\alpha$ for securing a width capable of absorbing the pitch errors of the notches 22, the pocket 31, etc. This angle of inclination $\alpha$ is provided with a segment L linking the point of intersection 100 between the extensions of two surfaces forming the notch 22, i.e., a surface 23 radially rising and receiving a force F, and a bottom surface 27, and the central point of the inner ring 20 together as the reference. However, the limit of this angle of inclination $\alpha$ is an angle at which the pawl 40 does not slip relative to the surface 23 during the meshing of the ratchet type one-way clutch 1, specifically the order of 5.5°. When the inclination is a minus angle of inclination $\beta$ with respect to the reference line L, even if the pawl 40 slips relative to the surface 23, it is supported by the surface 27 and a corner portion 25 and therefore, such a problem does not arise. According to the present invention, it becomes possible to drop each pawl 40 reliably into the notch 22 during the meshing.

[Fifth Embodiment]

Figure 8:
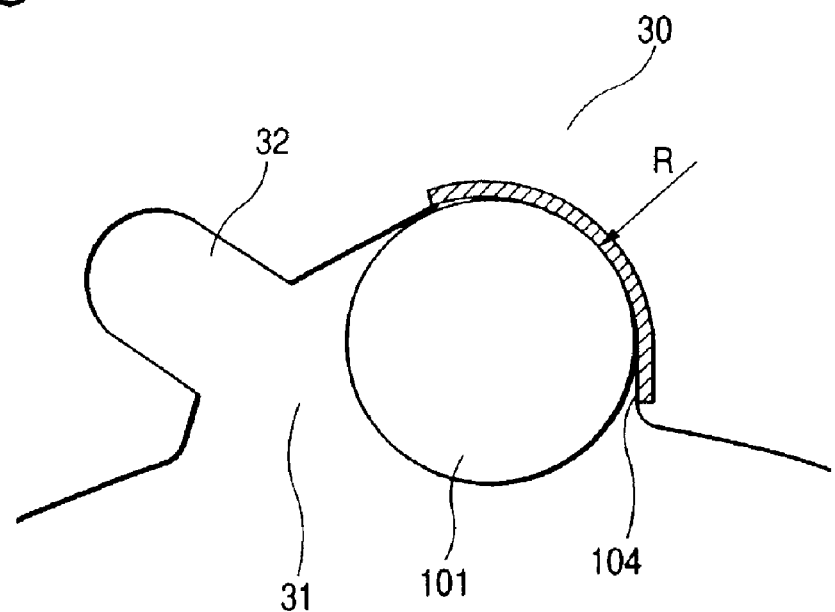
FIG. 8 is an enlarged front view of the pressure receiving surface of the pocket of an outer ring in a fifth embodiment of the present invention.

FIG. 8 is an enlarged front view of the pressure receiving surface of the pocket of the outer ring in the fifth embodiment of the present invention. During the idle rotation of the ratchet type one-way clutch 1, the pawls 40 are normally urged against the inner ring 20 and therefore, the pawls 40 move in such a manner that they vibrate radially. If the pressure receiving surface of each of the pawls 40 and pocket 31 is flat, the pawls 40 repeat the contact with the pressure receiving surface 104 of the pocket 31 by the surface and corner portion and therefore the pressure receiving surface is liable to wear.

So, in the present embodiment, the pressure receiving 104 of the pocket 31 is formed into an arcuate shape having a predetermined radius of curvature R. In the present embodiment, there are the action of restraining wear and the action that it becomes difficult for fracture to occur because the pressure receiving surface 104 is not adjacent to the corner portion, and in addition, it becomes possible to make the angle of inclination $\alpha$ of the notch 22 somewhat great. This working of the pressure receiving surface 104 will be easy if plastic working is used. As this plastic working, there is the working by a reamer 101 shown in FIG. 8, broach working, slotter working or the like.

[Sixth Embodiment]

Figure 9:
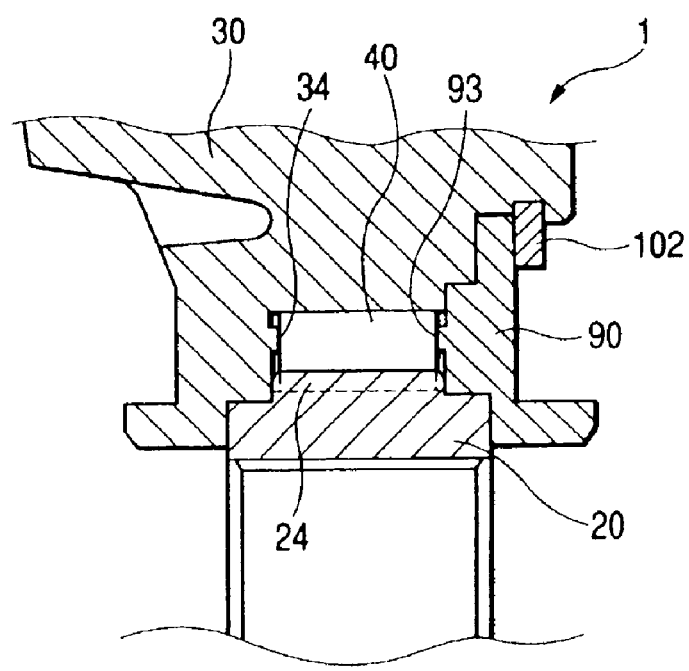
FIG. 9 is a cross-sectional view of the essential portions of a ratchet type one-way clutch according to a sixth embodiment of the present invention.

FIG. 9 is a cross-sectional view of the essential portions of a ratchet type one-way clutch according to the sixth embodiment of the present invention. Usually, the bearing member 90 is interposed between the outer ring 30 and the inner ring 20, and the bearing between the outer ring 30 and the inner ring 20 can be provided by the outer peripheral surface 26 (see FIG. 7) of the inner ring formed among the notches 22, but according to the present embodiment, the outer peripheral surface 26 of the inner ring 20 can be decreased or eliminated and the number of the notches 22 can be increased, and there is obtained the effect of decreasing backlash. Here, the backlash means the amount of idle rotation in the meshing direction.

[Seventh Embodiment]

Figure 10:
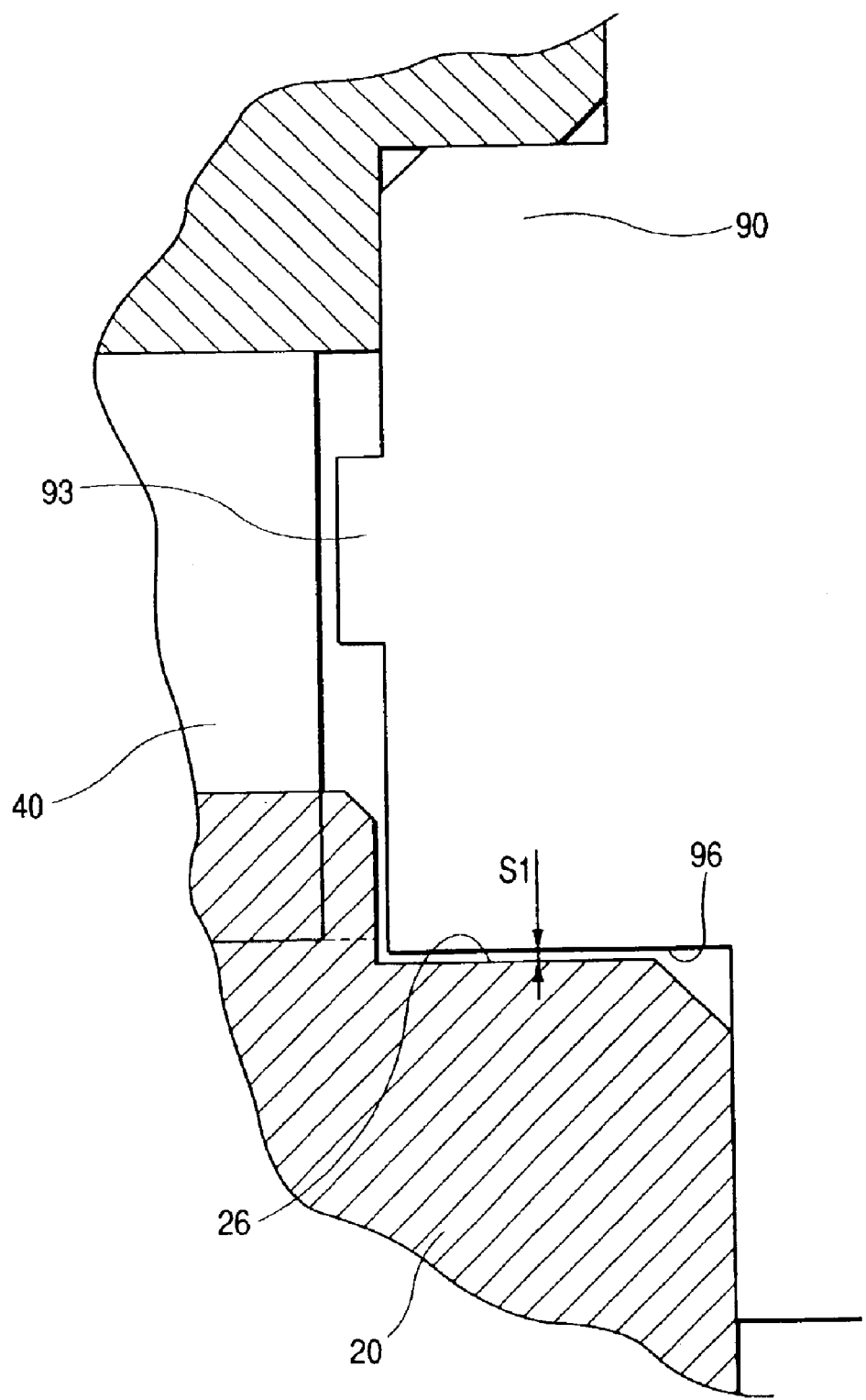
FIG. 10 shows a seventh embodiment of the present invention, and is an enlarged view of the essential portions of FIG. 9.
Figure 11:
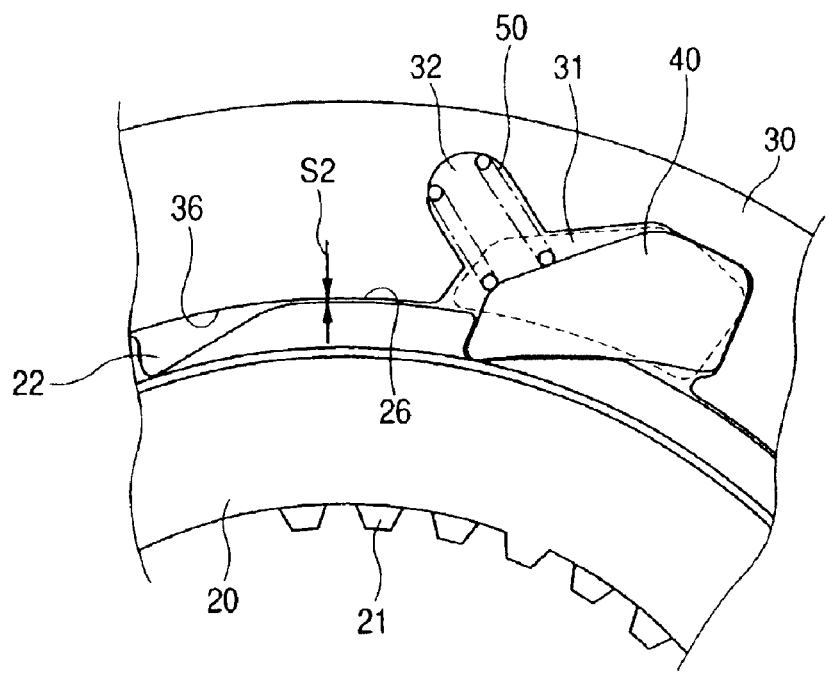
FIG. 11 shows the seventh embodiment of the present invention, and is a front view showing the fitted state of a pawl and a notch.

FIGS. 10 and 11 show the seventh embodiment of the present invention, FIG. 10 being an enlarged view of the essential portions of FIG. 9, and FIG. 11 being a front view showing the fitted state of the pawl and the notch. When one of the plurality of pawls 40 does not fall into the notch 22, an eccentric load is created between the outer ring 30 and the inner ring 20. In the present embodiment, a clearance S1 (FIG. 10) is provided between the bearing member 90 and the inner ring 20, or a clearance S2 (FIG. 7) is provided between the inner peripheral surface 36 of the outer ring 30 and the outer peripheral surface 26 of the inner ring 20. By these clearances, the pitch errors of the notches 22, the pockets 31, etc. can be absorbed and each pawl 40 can be reliably dropped into the notch 22.

The total of the clearances S1 and S2 is set so as to be greater than the total of the accuracy errors of the size of the pawls 40, the size and arrangement position of the pockets 31, and the shape and arrangement position of the notches 22.

[Eighth Embodiment]

Figure 12:
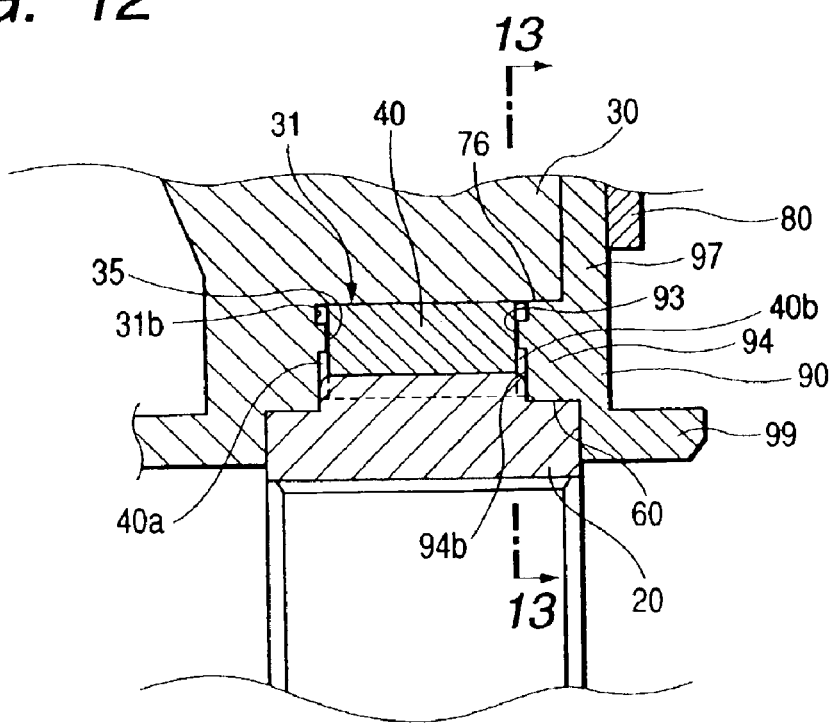
FIG. 12 shows an eighth embodiment of the present invention, and is a fragmentary enlarged view of the ratchet type one-way clutch of FIG. 2.

FIG. 12 is a fragmentary enlarged view of the ratchet type one-way clutch of FIG. 2, illustrating the eighth embodiment of the present invention. The construction of the side plate 90 which is a part of the ratchet type one-way clutch 1 of the present invention will hereinafter be described in detail with reference to FIG. 12. The side plate 90 having a substantially L-shaped cross-section comprises an annular plate portion 97, a protruding portion 99 substantially perpendicularly protruding from one radial end portion of the plate portion 97, and a convex portion 94 substantially perpendicularly protruding from the plate portion 97 in opposed relationship with the protruding portion.

Further, an axially protruding cylindrical projection 93 is provided on the axial side 94b of the convex portion 94, and one axial side 40a of the pawl 40 is supported by the projection 93.

On the other hand, an axially protruding cylindrical projection 35 is also provided on the wall surface 31b of the pocket 31. Accordingly, the axially opposite sides of the pawl 40 are supported by the projection 35 provided on the outer ring and the projection 93 provided on the convex portion 94 of the side plate, respectively. The projection 35 and the projection 93 are provided with a view to reduce the viscosity resistance of lubricating oil relative to the pawl 40. However, as the disposition of the projections, it is most desirable to provide the two projections so as to support the center of movement of the pawl 40.

Figure 13:
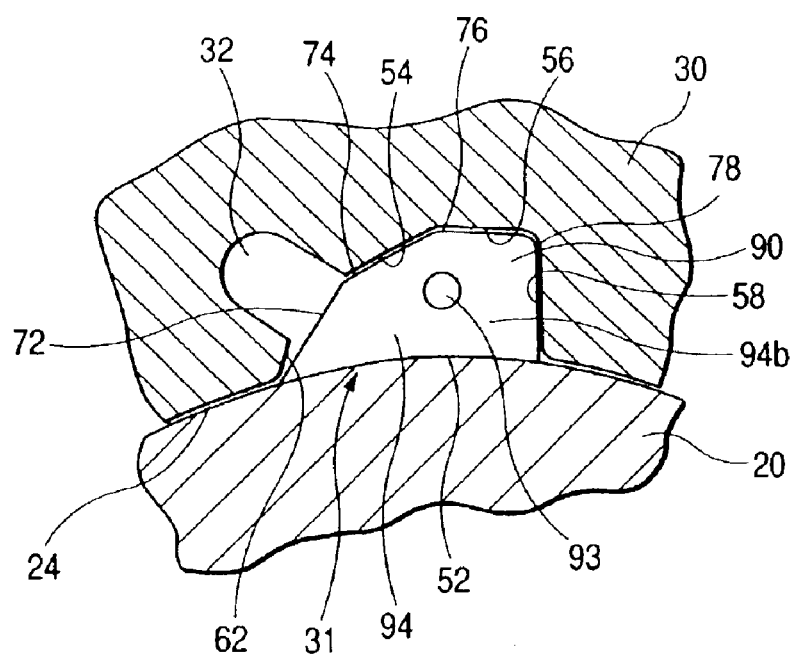
FIG. 13 is a circumferential cross-sectional view along the line 13—13 of FIG. 12.
Figure 14:
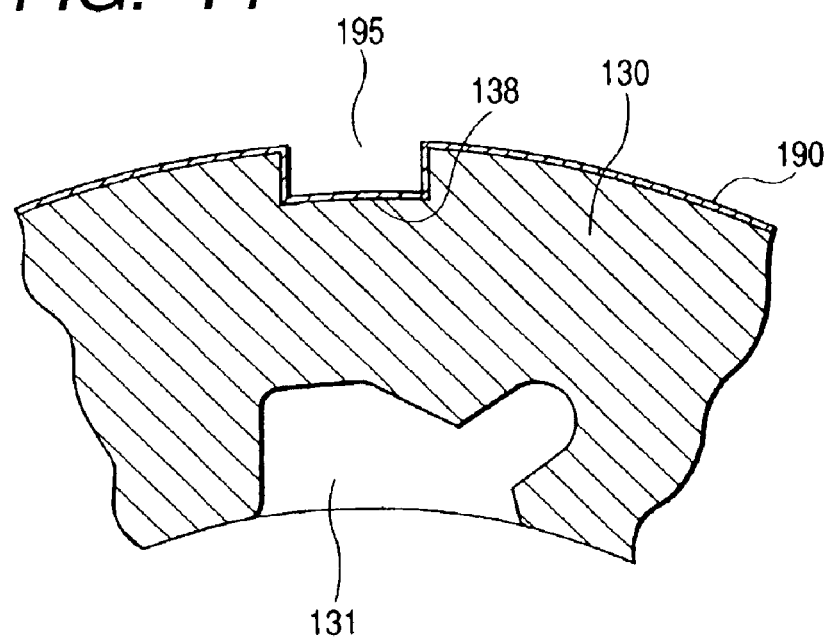
FIG. 14 is a circumferential fragmentary cross-sectional view of a ratchet type one-way clutch according to the prior art.

Further, the pocket 31 of the outer ring 30 and the convex portion 94 provided on the side plate 90 will now be described in detail with reference to FIG. 13. FIG. 13 is a fragmentary cross-sectional view taken along the line 13—13 of FIG. 12, and shows a state in which the convex portion 94 is fitted in the pocket 31. However, the coil spring or the like provided in the spring pocket 32 is not shown for the purpose of clarifying the illustration.

The pocket 31 is comprised of an engagement surface 58 extending radially of the outer ring 30, an upper surface 56 extending circumferentially from the engagement surface 58, an inclined surface 54 inclined from the upper surface 56 toward the inner ring, and a rear surface 62 inclined from the inclined surface 54 toward the inner ring. The rear surface 62 is connected to an inner peripheral surface 60. The spring pocket 32 for containing therein a resilient member for biasing the pawl 40 (see FIG. 3) against the inner ring 20 is more proximate to a pawl 40b (see FIG. 1) than the projection 93 and is formed substantially perpendicularly to the rear surface 62.

The convex portion 94 of the side plate 90 is defined by an engagement surface 78, an upper surface 76, an inclined surface 74 and a rear surface 72 having shapes complementary to the engagement surface 58, the upper surface 56, the inclined surface 54 and the rear surface 62 defining the pocket 31, and an abutting surface 94b having the projection 93.

If circumferential positioning is effected by the convex portion 94 of the above-described construction, the position of the projection 93 can be maintained accurate and also, it becomes possible to regulate the movement of the side plate 90 in the circumferential direction. Further, it is possible to give the bearing function to all of the inner peripheral surface 60 of the side plate 90, the inner peripheral side 52 of the convex portion 94 and the inner peripheral surface 24 of the outer ring 30.

Of course, the above embodiments have been described as the illustrative examples of the present invention and do not restrict the present invention.

The present invention achieves the following various effects.

The surface of the pocket against which the pawl strikes is subjected to the hardening process and therefore, the durability of the ratchet type one-way clutch using the outer ring made of aluminum can be improved.

Also, the ratchet type one-way clutch is constructed so as to improve the meshing performance thereof and therefore, the durability of the ratchet type one-way clutch can be improved.

The pressure receiving surface of the notch is designed to have a predetermined angle of inclination with respect to a line linking the point of intersection between the surfaces forming the notch and the center of the inner ring together and therefore, during meshing, the pawl reliably falls into the notch.

The pressure receiving surface of the pocket and the pressure receiving surface of the pawl contacting with the said surface are arcuate and therefore, there are obtained the action of restraining wear and the action that it becomes difficult for fracture to occur because the pressure receiving surface is not adjacent to the corner portion.

The bearing member for securing the proper clearance between the inner ring and the outer ring is provided and the number of the notches can be increased, whereby there is obtained the action of decreasing backlash.

The clearance between the outer peripheral surface of the inner ring and the inner peripheral surface of the outer ring or the clearance between the inner ring and the bearing member is greater than the total of the accuracy errors of the size of the pawls, the size and arrangement position of the pockets, and the shape and arrangement position of the notches and therefore, the pawls can be reliably dropped into the notches.

The side plate of the ratchet type one-way clutch is designed to be capable of being fitted in the pockets of the outer ring and be provided with a convex portion having the bearing function, whereby it is not necessary to provide convex portions and concave portions only for fitting the side plate to the outer ring on the outer ring and the side plate and therefore, the working process can be simplified.

What is claimed is:

1. A method of manufacturing a ratchet type one-way clutch having an outer ring having a pocket in the inner periphery thereof, an inner ring disposed coaxially with said outer ring and having a notch in the outer periphery thereof, a pawl contained in said pocket and fitted in the notch of said inner ring for transmitting torque between said inner ring and said outer ring, and a resilient member for biasing said pawl toward said inner ring, characterized by the steps of:

molding said outer ring from aluminum by diecasting; and subjecting the inner peripheral side surface of said outer ring to a hardening process wherein a joined surface of said pawl to said pocket is given an angle of inclination conforming to a draft angle created by the molding of said outer ring by diecasting.

2. A manufacturing method according to claim 1, characterized in that said hardening process is shot peening.

3. A manufacturing method according to claim 1, characterized in that said method includes the step of subjecting the pressure receiving surface of said pocket against which said pawl strikes to a coining process.

4. A manufacturing method according to claim 1, characterized in that said hardening process is hard alumite processing.

5. A manufacturing method according to claim 1, characterized in that said method includes the step of subjecting the pressure receiving surface of said pocket against which said pawl strikes to a sizing process.

* * * * *